United States Patent Office 2,774,790
Patented Dec. 18, 1956

2,774,790

CONVERTING OXAZINE COMPOUNDS TO GAMMA-HYDROXY AMINES

Howard D. Hartough, Wilmington, Del., and Joseph J. Dickert, Jr., Westville, and Seymour L. Meisel, West Deptford Township, Gloucester County, N. J., assignors to Socony Mobil Oil Company, Inc., a corporation of New York No Drawing. Original application June 17, 1950, Serial No. 168,852. Divided and this application October 24, 1952, Serial No. 316,777

3 Claims. (Cl. 260—584)

In the co-pending application for United States Letters Patent Serial No. 129,948 now U. S. Patent 2,647,117, filed November 29, 1949 in the names of Howard D. Hartough, Joseph J. Dickert, Jr. and Seymour L. Meisel, the copending application for United States Letters Patent Serial No. 169,792 now U. S. Patent 2,647,118, filed June 22, 1950 in the names of Howard D. Hartough, Joseph J. Dickert, Jr. and Seymour L. Meisel and the co-pending application for United States Letters Patent Serial No. 159,126 now U. S. Patent 2,678,333, filed April 29, 1950 in the names of Howard D. Hartough, Joseph J. Dickert, Jr. and Seymour L. Meisel, the aminomethylation of olefinic compounds has been described in general terms, with respect to obtaining increased yields of bis-(substituted tetrahydro-1,3-oxazino)-methanes and with respect to substituting aminomethylsulfonic acids for ammonium hydrohalide respectively. The present invention is concerned with converting the aminomethylation products referred to hereinabove into gamma-hydroxy amines.

It has also been discovered that active formaldehyde can be removed from the products of the aminomethylation of olefinic compounds by (1) methanol and ammonium halide, (2) sulfuric acid and (3) urea. Since the removal of active formaldehyde from the amines by reaction with urea yields a polymeric material from which neither the formaldehyde nor the urea can be recovered it is preferred to remove the active formaldehyde from these and similar amines by reaction with methanol and ammonium halide or sulfuric acid. The reaction with methanol yields methylal. The foregoing methods for removing active formaldehyde from the products of the aminomethylation of olefinic compounds are illustrated in Examples I and II for urea, Examples III and IV for methanol and ammonium halide and Examples V through VIII for sulfuric acid.

*Example I*

To about 115 parts by weight of the amine product from the aminomethylation of isobutylene were added about 100 parts by weight of concentrated hydrochloric acid and about 60 parts by weight of urea. The mixture was heated on a steam-bath (92°–97° C.) for about 4 hours, cooled to room temperature (20°–30° C.) and then allowed to stand at ambient temperature for about 16 hours. A urea-formaldehyde polymer began forming in the mixture during heating. The polymer was separated and washed with ethanol. After air drying for about 16 hours there were about 30 parts by weight of polymer.

The filtrate was warmed on the steam-bath for about 1 hour (to remove the ethanol of the washings which had been combined therewith) and was treated with about 80 parts by weight of sodium hydroxide and about 150 parts by weight of water. Thereafter, the filtrate was extracted with hot benzene. A layer of oil, insoluble in both benzene and water, was separated and added to the benzene extract. The solvent was removed by distillation leaving a residue of about 84 parts by weight. A portion of this liquid was distilled under reduced pressure with the following results:

| Fraction No. | Final Vapor Temp., °C. | Pressure, mm. of Hg | $n_D^{20}$ | Parts by Weight |
|---|---|---|---|---|
| IBP | 34 | 45 | | |
| 1 | 82 | 45 | 1.4528 | 4 |
| 2 | 96 | 45 | 1.4530 | 7 |
| 3 | 100 | 45 | 1.4542 | 7 |
| 4 | 101.5 | 45 | 1.4560 | 6 |
| 5 | 101.5 | 45 | 1.4580 | 4 |
| 6 | 101.5 | 45 | 1.4616 | 5 |
| 7 | 103 | 45 | 1.4688 | 6 |
| 8 | 103 | 45 | 1.4774 | 3 |
| Residue | | | | 21 |

Fraction 6 formed a phenylthiourea when treated in the usual manner with phenyl isothiocyanate. This derivative was recrystallized four times from absolute ethyl acetate and dried in a high vacuum at about 100° C. The recrystallized material melted at 117.5° C.–118.5° C. The recrystallized material was analyzed with the following results:

| | Percent C | Percent H | Percent N | Percent S |
|---|---|---|---|---|
| Calculated for $C_{12}H_{18}N_2OS$ | 60.50 | 7.56 | 11.76 | 13.45 |
| Found | 60.26 | 7.52 | 11.82 | 13.45 |

These values justify the formula:

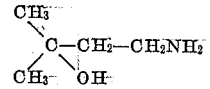

for the amine from which the foregoing phenylthiourea was derived.

*Example II*

To about 111 parts by weight of bis-(phenyltetrahydro-1,3-oxazino)-methane were added about 72 parts by weight of concentrated hydrochloric acid in about 250 parts by weight of water. The solution was heated to boiling and about 62 parts by weight of urea were added portionwise. No precipitate of formaldehyde-urea polymer was noted until more than half of the urea had been added. The urea-formaldehyde polymer was separated and the liquid reaction mixture was allowed to stand for about 9 days. (About 34 parts by weight of urea-formaldehyde polymer were obtained.) On the 10th day additional solid material settled out. A small sample of the remaining solution was treated with aqueous sodium hydroxide and the resultant oil was reacted in the conventional manner with phenyl isothiocyanate. The phenylthiourea thus obtained melted at 134°–135° C. and when mixed with an authentic sample of the phenylthiourea of

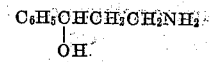

did not depress the melting point.

*Example III*

To about 85 parts by weight of the bis-(phenyl substituted tetrahydro-1,3-oxazino)-methane obtained from styrene were added about 150 parts by weight of water, about 60 parts by weight of concentrated hydrochloric acid and about 250 parts by weight of methanol. The mixture was agitated at room temperature (20°–30° C.) for about 1 hour, allowed to stand for about 16 hours at room temperature, and then heated to reflux temperature for about 1 hr.

The methylal and excess methanol were removed from the reaction mixture by distillation (maximum temperature 100° C.). The reaction mixture was cooled and extracted with diethyl ether. Removal of the solvent from this extract yielded less than 1 part by weight of benzaldehyde. The extracted reaction mixture was treated with about 55 parts by weight of an aqueous 40% sodium hydroxide solution. The amine which separated was distilled as indicated in the following tabulation:

| Fraction No. | Vapor Temp., °C. | Pressure, mm. of Hg | Parts by Weight |
|---|---|---|---|
| IBP | 102 | 1.1 | |
| 1 | 114 | 1.0 | 9 |
| 2 | 117-119 | 1.6-1.0 | 26 |
| 3 | 119 | 1.0 | 27 |
| Residue | | | 13 |

Crystals appeared in Fraction 2 during the distillation. Both Fractions 2 and 3 crystallized and Fraction 1 crystallized immediately after being "seeded" with crystals from Fraction 3. The residue was still distillable, had only a slight yellow color and was crystalline at room temperature, an indication that the residue and the distilled product were the same product.

The melting point of Fraction 3 was 59.0°-60.5° C. After recrystallization from benzene the product melted at 59.5°-61.0° C. The product was analyzed with the results presented in the following table:

| | Percent C | Percent H | Percent N |
|---|---|---|---|
| Calculated for C₉H₁₃NO | 71.52 | 8.61 | 9.27 |
| Found | 71.74 | 8.60 | 9.41 |

The calculated values given in the table correspond to the structure

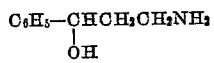

$$C_6H_5-CHCH_2CH_2NH_2$$
$$\phantom{C_6H_5-}|$$
$$\phantom{C_6H_5-C}OH$$

This material also was formed by sulfuric acid hydrolysis of the corresponding bis-methane.

A phenylthiourea was prepared in a conventional manner from Fraction 3. After recrystallization from 95% ethanol this derivative melted at 135°-136° C. The phenylthiourea was analyzed with the following results:

| | Percent C | Percent H | Percent N | Percent S |
|---|---|---|---|---|
| Calculated for C₁₆H₁₈N₂OS | 67.14 | 6.33 | 9.79 | 11.19 |
| Found | 67.08 | 6.52 | 10.19 | 11.15 |

*Example IV*

To about 230 parts by weight of the crude reaction product from the aminomethylation of isobutylene were added about 200 parts by weight of water, about 200 parts by weight of concentrated hydrochloric acid and about 600 parts by weight of methanol. The reaction mixture was stirred for about 1 hour at room temperature, allowed to stand for about 16 hours and then heated to reflux temperature for about 1 hour.

The methylal, excess methanol and a part of the water were removed from the reaction mixture by distillation (maximum temperature, 110° C.). The reaction mixture was treated with about 200 parts by weight of aqueous, 40% sodium hydroxide solution, cooled to room temperature and filtered to remove the salt. The filtrate was extracted with benzene. An excess of sodium hydroxide was added to the filtrate. This caused a separation of benzene insoluble oil which was separated from the aqueous solution and added to the benzene extract. The benzene was removed from the extract and the residue distilled under reduced pressure. (At about 33 mm. of Hg about 20 parts by weight of benzene were collected in the Dry Ice trap.) The log of this distillation follows:

| Fraction No. | Vapor Temp., °C. | Pressure, mm. of Hg | $n_D^{20}$ | Parts by Weight |
|---|---|---|---|---|
| IBP | 33 | 28 | | |
| 1 | 105 | 28 | 1.4578 | 32 |
| 2 | 105 | 28 | 1.4578 | 18 |
| 3 | 110 | 28 | 1.4618 | 13 |
| 4 | 115 | 28 | 1.4688 | 8 |
| 5 | 67-72 | 0.2-0.3 | 1.4796 | 9 |
| Residue | | | | 37 |

The residue was a viscous brown liquid containing further distillable product. The distillation was stopped due to the exigencies of the situation.

A phenylthiourea was prepared from Fraction 2 in accordance with conventional procedures and recrystallized from an ethanol-water mixture. The recrystallized material melted at 122°-123° C. The recrystallized material was analyzed with the results presented in the following tabulation:

| | Percent C | Percent H | Percent N | Percent S |
|---|---|---|---|---|
| Calculated for C₁₂H₁₈N₂OS | 60.50 | 7.56 | 11.76 | 13.45 |
| Found | 59.97 | 7.80 | 11.96 | 13.46 |

These calculated values correspond to the phenylthiourea derivative of an amine having the structure

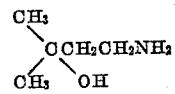

*Example V*

About 100 parts by weight of the bis-(phenyl substituted tetrahydro-1,3-oxazino)-methane from styrene (preparation described in co-pending applications Serial Nos. 129,948 now U. S. Patent 2,647,117; 159,126 now U. S. Patent 2,678,333 and 169,792 now U. S. Patent 2,647,118) were added to a solution of about 75 parts by weight of concentrated sulfuric acid in about 375 parts by weight of water (about 10% H₂SO₄). The odor of formaldehyde immediately was detectable. About 250 parts by weight of methanol were added to the mixture and the resultant reaction mixture warmed on a steam-bath (90°-95° C.) for about 3 hours. Since practically all of the methanol had evaporated at this time but the odor of formaldehyde still persisted, about 25 parts by weight of ammonium chloride and about 125 parts by weight of methanol were added to the reaction mixture and the reaction mixture was heated on a steam-bath until the methanol had evaporated. The reaction mixture was then evaporated to about 0.5 of the original volume. At this point the odor of formaldehyde was no longer detectable but there was a strong odor of hydrochloric acid. The reaction mixture was neutralized with 40% aqueous caustic and extracted with diethyl ether. The ether solution was dried over anhydrous calcium sulfate (Drierite) and the ether was evaporated. About 101 parts by weight of light yellow amine were obtained. This material was distilled under reduced pressure. The data of this distillation are presented in the following tabulation:

| Fraction No. | Vapor Temp., °C. | Pressure, mm. of Hg | $n_D^{20}$ | Parts by Weight |
|---|---|---|---|---|
| IBP | 84 | 0.6 | | |
| 1 | 90 | 0.6 | 1.5400 | 6 |
| 2 | 94 | 0.6 | 1.5416 | 11 |
| 3 | 97 | 0.5 | 1.5440 | 11.5 |
| 4 | 95 | 0.3 | 1.5470 | 10 |
| 5 | 105 | 0.5 | 1.5496 | 11.5 |
| 6 | 114 | 0.45 | 1.5514 | 10.5 |
| 7 | 117 | 0.45 | }Crystalline | 19.0 |
| 8 | 121 | 0.45 | | |
| Residue | | | | 7.5 |
| Cold trap | | | | 12.09 |

The principal constituent of Fractions 1 and 2 is

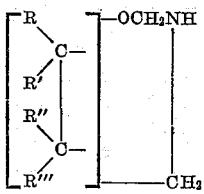

where R is C₆H₅ and R', R" and R'" are hydrogen.

Fractions 4, 5 and 6 crystallized rapidly after "seeding" with crystals from Fractions 7 and 8. This material was recrystallized from benzene and dried under reduced pressure. The dried recrystallized material melted at 61°–62° C. The data of the analysis of this material is given as follows:

| | Percent C | Percent H | Percent N |
|---|---|---|---|
| Calculated for $C_9H_{13}NO$ | 71.52 | 8.61 | 9.27 |
| Found | 70.82 | 8.54 | 9.16 |

On the basis of this analysis the formula

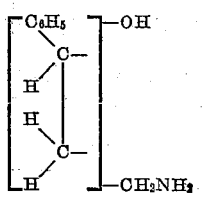

is justified.

A phenylthiourea was made of this material in the standard manner and recrystallized from absolute ethanol. The recrystallized material had a melting point of 135°–135.5° C. Upon analysis the following values were obtained:

| | Percent C | Percent H | Percent N |
|---|---|---|---|
| Calculated for $C_{16}H_{18}N_2OS$ | 67.0 | 6.3 | 9.8 |
| Found | 67.28 | 6.51 | 10.39 |
| | 66.83 | 6.57 | 10.29 |

Example VI

The reaction described in Example V was repeated using the oil from which bis-(phenyl substituted tetrahydro-1,3-oxazino)-methane had been removed; i. e., oil from the aminomethylation of styrene in the manner described in co-pending application Serial No. 129,948 now U. S. Patent 2,647,117 from which the bis-methane had been removed. The odor of benzaldehyde was noticeable. The reaction mixture was extracted with diethyl ether before heating and about 2 parts by weight of benzaldehyde were obtained. The reaction mixture was heated on a steam-bath for about 3 hours. At this point no odor of formaldehyde was detectable. However, there was an unmistakable odor of hydrochloric acid. The material was neutralized with aqueous 40% caustic and extracted with diethyl ether. The ether was evaporated and the amine so obtained distilled under reduced pressure.

The data of this distillation is presented in the following tabulation:

| Fraction No. | Vapor Temp., °C. | Pressure, mm. of Hg | $n_D^{20}$ | Parts by Weight |
|---|---|---|---|---|
| IBP | 59 | 0.9 | | |
| 1 | 59 | 0.7 | 1.5257 | 5 |
| 2 | 74 | 0.5 | 1.5339 | 6 |
| 3 | 73 | 0.4 | 1.5393 | 6 |
| 4 | 74 | 0.4 | 1.5412 | 6 |
| 5 | 76 | 0.4 | 1.5428 | 6 |
| 6 | 77 | 0.4 | 1.5442 | 6.5 |
| 7 | 75 | 0.2 | 1.5453 | 6 |
| 8 | 84 | 0.5 | 1.5442 | 6 |
| 9 | 72 | 0.2 | 1.5459 | 5 |
| 10 | 92 | 0.5 | 1.5476 | 2.5 |
| Residue (black, resinous, brittle) | | | | 19 |

It is to be noted that in contrast to the previous example no high boiling material was obtained. Based upon the boiling points and refractive indices, Fractions 1 through 3 have as the principal constituent N-methylphenylhydroxypropylamine while the latter fractions are predominantly phenyl-substituted tetrahydro-1,3-oxazine.

Example VII

About 100 parts by weight of the amine from isobutylene, prepared in the manner described in the copending applications to which reference has been made hereinbefore, was reacted with about 375 parts of water containing about 138 parts by weight of concentrated sulfuric acid (about 27% $H_2SO_4$) as described in Examples V and VI. It is to be noted that no methanol nor ammonium chloride was used in this reaction.

The product after neutralization was insoluble in ether. The organic layer was drained off and separated from dissolved or entrained water by the addition of potassium carbonate. The resultant product was dried over additional potassium carbonate and distilled under reduced pressure with the results given in the following tabulation:

| Fraction No. | Vapor Temp., °C. | Pressure, mm. of Hg | $n_D^{20}$ | Parts by Weight |
|---|---|---|---|---|
| IBP | 44 | 105 | | |
| 1 | 54 | 105 | 1.3630 | 11 |
| 2 | 45 | 38 | 1.3682 | 9 |
| 3 | 66 | 7.5 | 1.4508 | 9 |
| 4 | 62 | 1.2 | 1.4580 | 9 |
| 5 | 82 | 1.2 | 1.4746 | 10 |
| 6 | 94 | 1.0 | 1.4850 | 11 |
| 7 | 114 | 1.1 | 1.4856 | 6 |
| 8 | 122 | 1.2 | 1.4905 | 5 |
| Residue (black solid) | | | | 13 |

Fraction 6 was found to contain 10.49% nitrogen which is indicative of the presence of materials of low nitrogen content. Such materials could be dihydric alcohols formed by the reduction of unremoved dioxanes. Any unreduced oxazine would also lower the nitrogen content of this fraction.

Fractions 6 and 7 crystallized on standing. Fraction 6 was recrystallized from benzene and dried under reduced pressure for about 16 hours. The recrystallized material had a melting point of 122°–123° C. The dried recrystallized material contained 9.29% nitrogen. A phenylthiourea, M. P. 193.5–194, was formed from this recrystallized material according to a standard procedure and was found to contain 11.22% nitrogen.

Example VIII

About 100 parts by weight of crude amine from 2-methyl-1-pentene (prepared in the manner described in the co-pending applications to which reference has been made hereinbefore) was reacted with a mixture of about 375 parts by weight of water and about 75 parts by weight of concentrated sulfuric acid. The reaction product was much more soluble in ether than that obtained in the previous example. The ether solution of the product was dried over potassium carbonate and the dried amine distilled under reduced pressure. Eighty-nine parts by weight of crude reaction product were obtained. A log of the distillation of the crude amine reaction product follows:

| Fraction No. | Vapor Temp., °C. | Pressure, mm. of Hg | $n_D^{20}$ | Parts by Weight |
|---|---|---|---|---|
| 1 | 52 | 0.5 | 1.4595 | 5 |
| 2 | 57 | 0.1 | 1.4610 | 9 |
| 3 | 63 | 0.5 | 1.4660 | 10 |
| 4 | 77 | 0.5 | 1.4730 | 10 |
| 5 | 88 | 0.5 | 1.4820 | 10 |
| 6 | 96 | 0.5 | 1.4822 | 11 |
| 7 | ¹103 | 0.5–0.6 | 1.4821 | 12 |
| Residue | | | | 8.5 |

¹ Some decomposition.

Fractions 4, 5, 6 and 7 were redistilled through a one-foot glass-packed column. The following data was obtained thereby:

| Fraction No. | Final Vapor Temp., °C. | Pressure, mm. of Hg | $n_D^{20}$ | Parts by Weight |
|---|---|---|---|---|
| 1 | 40 | 1.6 | 1.4635 | 3 |
| 2 | 44 | 1.6 | 1.4614 | 2 |
| 3 | 70 | 1.5 | 1.4669 | 3 |
| 4 | 69 | 1.4 | 1.4778 | 3 |
| 5 | 75 | 1.3 | 1.4828 | 3.5 |
| 6 | 79 | 1.5 | 1.4861 | 3 |
| 7 | 79 | 1.4 | 1.4873 | 3.5 |
| 8 | 95 | 1.3 | | 7 |
| Residue | | | | 2 |

Crystallization started in the column during distillation of Fraction 8. The column was heated by an external source sufficiently to eliminate crystallization. After recrystallization from benzene and petroleum ether, the material of Fraction 8 had a melting point of 87°–87.5° C. and had the following analysis:

| | Percent C | Percent H | Percent N |
|---|---|---|---|
| Calculated for $C_8H_{17}NO$ | 67.0 | 11.9 | 9.79 |
| Found | 67.10 | 11.88 | 9.82 |

This application is a division of copending application, Serial Number 168,852, now U. S. Patent 2,652,429, filed June 17, 1950.

What is claimed is:

1. A method for converting a nitrogen-containing product selected from the group consisting of 1,3-oxazines and bis-(1,3-oxazino)methanes at least one carbon atom of the heterocyclic nucleus of said oxazines and oxazino radicals having at least one substituent radical selected from the group consisting of lower alkyl radicals and phenyl radical and being otherwise unsubstituted into gamma-hydroxy amines, which comprises reacting said nitrogen-containing product with dilute aqueous mineral acid at reflux temperature, neutralizing with an aqueous solution of an alkali-metal-hydroxide, and separating the gamma-hydroxy amine from the neutralized product.

2. A method for converting a nitrogen-containing product selected from the group consisting of 1,3-oxazines and bis-(1,3-oxazino)methanes at least one carbon atom of the heterocyclic nucleus of said oxazines and oxazino radicals having at least one substituent radical selected from the group consisting of lower alkyl radicals and phenyl radical and being otherwise unsubstituted into gamma-hydroxy amines, which comprises reacting said nitrogen-containing product with dilute aqueous hydrochloric acid and methanol at reflux temperature, neutralizing with dilute aqueous sodium hydroxide, and separating the gamma-hydroxy amine by distillation.

3. A method for converting a nitrogen-containing reaction product selected from the group consisting of 1,3-oxazines and bis-(1,3-oxazine)methanes at least one carbon atom of the heterocyclic nucleus of said oxazines and oxazino radicals having at least one substituent radical selected from the group consisting of lower alkyl radicals and phenyl radical and being otherwise unsubstituted into gamma-hydroxy amines, which comprises reacting said nitrogen-containing product with dilute aqueous sulfuric acid, neutralizing with aqueous sodium hydroxide, and extracting gamma-hydroxy amine with ether.

References Cited in the file of this patent

UNITED STATES PATENTS

| 2,251,081 | Taylor et al. | July 29, 1941 |
| 2,629,740 | Carnes | Feb. 24, 1953 |
| 2,644,013 | Barth | June 30, 1953 |

OTHER REFERENCES

Groggins: "Unit Processes In Org. Synthesis," (1947), 3rd ed., pp. 669–71.